United States Patent [19]

Giner

[11] Patent Number: 4,781,995
[45] Date of Patent: Nov. 1, 1988

[54] AQUEOUS CARBONATE ELECTROLYTE FUEL CELL

[75] Inventor: Jose D. Giner, Brookline, Mass.

[73] Assignee: Giner, Inc., Waltham, Mass.

[21] Appl. No.: 39,023

[22] Filed: Apr. 16, 1987

Related U.S. Application Data

[63] Continuation-in-part of Ser. No. 866,763, May 27, 1986, abandoned.

[51] Int. Cl.[4] .............................................. H01M 8/04
[52] U.S. Cl. ........................................ 429/13; 429/17; 429/42; 429/46
[58] Field of Search .................... 429/16, 13, 46, 17, 429/42

[56] References Cited

U.S. PATENT DOCUMENTS

| | | | |
|---|---|---|---|
| 2,175,523 | 10/1939 | Greger | 429/13 |
| 3,082,282 | 3/1963 | Gruneberg et al. | 429/13 |
| 3,350,228 | 10/1967 | Shropshire | 429/13 |
| 3,531,329 | 9/1970 | Selwitz | 429/42 |
| 3,847,672 | 11/1974 | Trocciola | 429/46 |
| 4,054,725 | 10/1977 | Tuburaya | 429/29 |
| 4,080,487 | 3/1978 | Reiser | 429/16 |
| 4,131,721 | 12/1978 | Fung et al. | 429/13 |
| 4,250,231 | 2/1981 | Maru | 429/13 |

Primary Examiner—Anthony Skapars
Attorney, Agent, or Firm—A. W. Breiner

[57] ABSTRACT

A fuel cell comprising an anode, a cathode and an aqueous carbonate electrolyte, and including means for feeding carbon dioxide to at least one of the anode and cathode during operation of the cell. The addition of carbon dioxide provides a higher current density at a working potential.

14 Claims, 2 Drawing Sheets

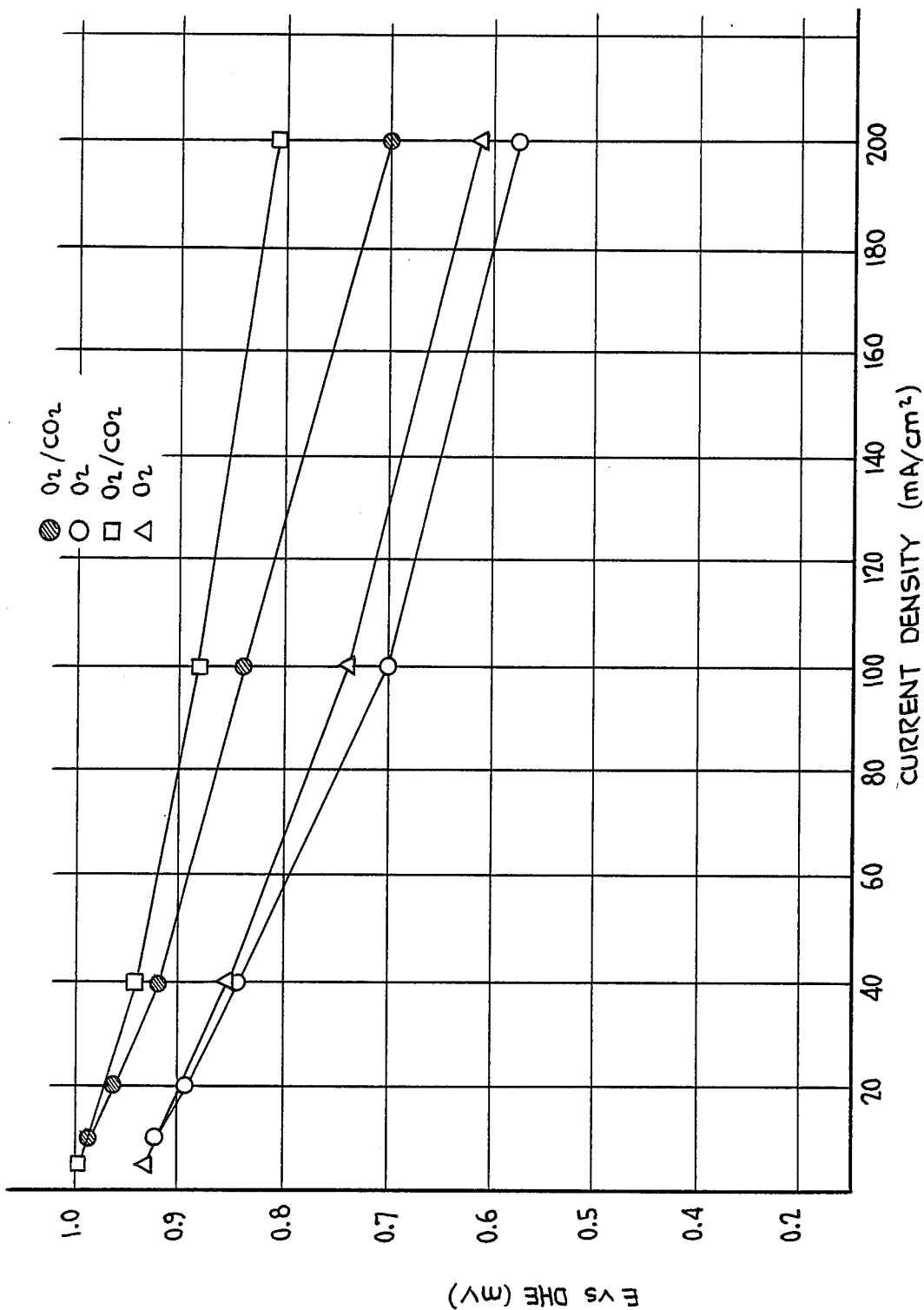

AQUEOUS CARBONATE ELECTROLYTE FUEL CELL

This is a continuation-in-part application of pending U.S. Ser. No. 06/866,763 filed May 27, 1986 now abandoned.

FIELD OF INVENTION

This invention relates to improved fuel cells utilizing aqueous carbonate solutions as the fuel cell electrolyte. More particularly, the invention relates to improved fuel cells comprising porous fuel and oxygen electrodes which are separated by an aqueous carbonate electrolyte, with at least one of the oxygen (air) and fuel electrodes being fed with carbon dioxide during operation of the cell.

BACKGROUND OF INVENTION

"Fuel cell," for purposes of this specification, is understood to be an electrochemical cell in which the free energy of combustion of the fuel cell is converted directly into electrical energy. Fuel cells have been recognized as a very efficient means for the direct conversion of the chemical energy of a fuel, including coal, hydrocarbons and products of their processing, into electricity. Not being thermal engines, they are not limited by the Carnot Cycle, and their efficiency is in principle high. In addition, since they are modular this efficiency, as well as the cost per unit of power, is broadly independent of size. Furthermore, the efficiency is not substantially degraded when operated at levels which are substantially lower than the rated power, and then any degradation is not due to the fuel cell proper. Fuel cells tend to be silent, with noise resultant from ancillary equipment only. Generally, fuel cells are non-polluting.

Because of all the aforesaid advantages, fuel cells have been the subject of considerable developmental work. For the electric utilities, fuel cells have characteristics which enable them to compete in a broad spectrum of applications from disperse, peak power plants, on the order of 10–20 megawatts, now served by inefficient, short life gas turbines to baseload applications of 1000 megawatts and more which are now served by very capital intensive coal and nuclear plants.

For the gas utilities, fuel cells are ideal for highly dispersed power plants with co-generation capabilities, operating on natural gas, or equivalent, for apartment buildings and industrial complexes. The size for the envisioned applications presently vary from 40 kilowatts to 200 kilowatts.

Another application for fuel cells, which is at an early state of development, is for electric automobile traction, with methanol, or possibly ethanol, as the primary fuel which may be reformed prior to use in the fuel cell. As a result of these applications there is a large interest in fuel cells.

A fuel cell is essentially a simple device and comprises as the only basic components a housing, fuel and oxidant electrodes, and an electrolyte which can be immobilized within a porous matrix. The fuel and oxygen electrodes of the cell are generally constructed as porous, planar members with one surface maintained in contact with the electrolyte while the fuel and oxygen gases are caused to come in contact with the other surface of the electrode. As the fuel and oxygen are passed through or in contact with the electrodes, they are reacted at the surface of the respective electrode.

In constructing an efficient fuel cell, the problem encountered is basically one of electrochemical or chemical kinetics, the object being to carry out the reaction of the fuel and oxidizing gas in such a manner that the proportion of free energy degraded into heat is as small as possible. Yet, it is necessary that the activity of the cell be sufficiently high so that the energy output from practical sized cells is economically high.

A large amount of the research has been expended upon the catalytic surface of the electrodes and to a lesser extent in developing more efficient electrolytes. The early work in the electrolyte area has been directed toward the use of solid and fused electrolytes such as the alkali and alkaline earth carbonates. Further, in the development of low and medium temperature fuel cells, aqueous electrolytes of alkali hydroxides including eutectic mixtures of the hydroxides with some water have received considerable attention. In the process of dissociation, these strongly basic materials produce large numbers of hydroxyl ions which readily transfer oxygen ions to the fuel electrode where, as for example, hydrogen ions react with oxygen or hydroxyl ions to form molecules of water.

For an efficient fuel cell, it is necessary that the electrolyte remain invariant and have a high ionic conductivity. When the electrolyte undergoes chemical change through reaction with the fuel, with impurities such as $CO_2$ in the air, or oxidation by the oxidizing gas, it is necessary to replenish or exchange the electrolyte in order to maintain the high activity and corresponding high current density of the fuel cell.

Most of the fuel cell development for commercial applications has been based on the phosphoric acid electrolyte fuel cell system, often described as the "first generation" commercial fuel cell system, in which the fuel utilized is the effluent gases from a hydrocarbon reformer or coal gasifier, which contain hydrogen, carbon dioxide and carbon monoxide, are passed through the anode of a phosphoric acid fuel cell at which the hydrogen is electrochemically oxidized. The cell operates at temperatures of 170° C.–210° C. and pressures of up to 10 Atm, depending on the application. Two complete 4.8 megawatt systems, fabricated by United Technologies Corporation, have been installed in New York City and Tokyo to demonstrate the application of the fuel cell for peak power production in electric utility applications. Of these two installations, the Tokyo one has been successfully operated.

In spite of the engineering advances made on the phosphoric acid fuel cell systems, a number of problems in the fuel cell stack have been recognized. The most important are (a) limitations in materials of construction, e.g., bipolar plates, which are expensive and prone to corrosion, especially at high cell voltages; (b) the relatively low voltage efficiency of the cell, which limits the total system efficiency, or "heat rate," an important consideration for electric utilities especially for the baseload application, and (c) the limitation in electrocatalyst selection to only platinum. Even at the high degree of dispersion presently obtainable of about 0.5 g/1000 cm$^2$, this limitation still represents a hindrance to the widespread introduction of fuel cells.

For all these reasons, even before the "first generation" phosphoric acid fuel cell has been commercially deployed, development on a "second generation fuel cell"—the molten carbonate fuel cell—has been underway. The materials demand for the molten carbonate fuel cell are quite staggering since it requires inexpensive components capable of operating at about 650° C. under strong oxidizing and/or reducing conditions. In particular, no cathode yet exists capable of showing thousands of hours of operation under pressure. Also, the cell anode is highly sensitive to hydrogen sulfide poisoning.

Although attention has been directed to aqueous alkaline or alkali cells, a particularly serious problem is encountered when carbonaceous fuels are used since carbon dioxide is produced as a by-product in the fuel processing or in the direct electrochemical oxidation of the fuel. This practically precludes the use of electrolytes containing alkali metal hydroxides, or other compositions which form insoluble carbonates. The formation of insoluble carbonates within the cell raises the melting point of the electrolyte and reduces the overall efficiency of the cell by increasing the internal resistance and/or by blocking the porous electrodes with insoluble matter, interrupting the continuity of the liquid electrolyte layer between the two electrodes and eventually causing a catastrophic failure. It is apparent from thermodynamic considerations that fuel cells utilizing carbonaceous fuels do not necessarily require high operating temperatures. The use of high temperatures in the prior art cells generally result from the nature of the solid or molten electrolyte used.

There is a need, therefore, for a fuel cell capable of rejecting carbon dioxide, which does not suffer from the serious materials problems shown by the phosphoric acid and the higher temperature cells, and which operates at an equal or higher cell efficiency than the phosphoric acid cell, and at no added capital cost. It is also desirable that the new cell be able to utilize the efforts invested in the development of other systems, particularly the phosphoric acid electrolyte technology, including the development of non-fuel cell components such as fuel processor and power conditioner, and permit use of the electrodes developed therefor, such as the Teflon-bonded gas-diffusion electrode structures. It is also desirable that any new fuel cell or fuel cell stack be able to retrofit presently designed plants, such as the phosphoric acid electrolyte plants.

PRIMARY OBJECTS AND GENERAL DESCRIPTION OF AQUEOUS CARBONATE ELECTROLYTE FUEL CELL AS IT RELATES TO INVENTION

Accordingly, it is a primary object of the instant invention to provide new and improved electrolyte systems for fuel cells which are alkaline in character.

It is a further object of the invention to provide fuel cells which have a high degree of activity for a long period of time and which operate at lower or medium temperatures.

It is a further object of the invention to provide a fuel cell wherein the electrolyte remains substantially invariant.

It is still a further object of the invention to provide an improved fuel cell wherein the corrosive and side reduction problems caused by the electrolyte are substantially minimized.

It is still another object of the invention to provide an improved method of operating a fuel cell.

These and other objects of the invention will be seen from the following detailed description with particular reference being given to the specific illustrative examples.

According to the instant invention, a fuel cell is constructed which is operated at medium and low temperatures using as the electrolyte an aqueous carbonate solution, and wherein the cell is operated in the presence of added $CO_2$ at the cell electrodes. Thus, it has been found that when $CO_2$ is added to the cell in an amount such that the concentration of free hydroxyl ions in the vicinity of the cathode is at most mildly alkaline and that the concentration of free hydrogen ions in the vicinity of the anode is at most slightly acidic, the cell provides substantially enhanced results.

The advantages of an aqueous carbonate fuel cell are (1) It is capable of rejecting $CO_2$ and, therefore, can maintain an invariant electrolyte, in contrast to a strong alkaline fuel cell;

(2) Its oxygen electrode can operate with less polarization than in an acid electrolyte because it operates in a somewhat alkaline environment;

(3) As is the case with alkaline fuel cells, it will allow the use of electrocatalysts other than platinum;

(4) The lower temperature used in comparison to a molten carbonate fuel cell and the milder electrolyte in comparison with a phosphoric acid electrolyte fuel cell makes possible the consideration of inexpensive materials of construction such as steel, carbon, and the like; and (5) Because of the broader selection of electrocatalysts, as well as the intrinsic effect of the electrolyte, higher tolerance to CO is possible, and even the efficient use of unreformed cabonaceous fuels, such as methanol, etc.

It was heretofore believed, however, that the use of an aqueous carbonate electrolyte in a fuel cell was not possible, or at least not practical, in that it was believed that a sizeable pH gradient would develop between the anode and the cathode of the cell during operation. Thus, in a basically neutral electrolyte, the anodic reaction produces acid in the immediate vicinity of the anode according to the equation—

$$H_2 \rightarrow 2H^+ + 2e^- \tag{1}$$

while the cathodic reaction produces base in the immediate vicinity of the cathode according to the equation—

$$\tfrac{1}{2}O_2 + H_2O + 2e^- \rightarrow 2OH^- \tag{2}$$

The electrolyte has to have a high buffering capacity in order to maintain the pH near both electrodes at the same value, believed to involve the transport of ionic buffering species from one electrode to the other. Failure to maintain an equal pH at both electrodes will produce an added concentration polarization according to the equation—

$$\Delta E_{pH} = 2 \times 10^{-4} \times T \Delta pH \tag{3}$$

where T is the absolute temperature, in °K, and $\Delta pH$ is the pH difference between cathode and anode.

In spite of the projected problem as above stated, because of its potential advantages, aqueous carbonate fuel cells have been the subject of investigations. E. J. Cairns and D. I. MacDonald, "Hydrocarbon Fuel Cells with Invariant Electrolytes," *Electrochem. Technology* 2, 1964, pp. 65-70 (Ref.1); and E. J. Cairns and D. C.

Bartosik, "A Methanol Fuel Cell with an Invariant Alkaline Electrolyte," *J. Electrochem. Soc.*, 111, 1964, pp. 1205-1210 (Ref.2), reported on experiments performed with complete fuel cells at atmospheric pressure with unreformed hydrocarbons (Ref.1) and methanol (Ref.2) as the fuel. The authors showed that at least when using very high Pt loadings the air cathode behaved reasonably well in cesium carbonate (FIG. 6 of Ref.2). By using cemium carbonate as the electrolyte, relatively high temperatures, up to 200° C., were obtained. Even so, the overall cell voltage was low in spite of very high loadings of platinum. Although the platinum loadings were unspecified in the papers, they are believed to have been loadings in the order of 30–50 mg/cm$^2$ based on the state of the art at the time of the publications. It is indeed surprising, therefore, to find that the additions of CO$_2$ to one of the fuel cell electrodes has a large, positive effect on the electrode potential.

DETAILED DESCRIPTION OF INVENTION AND PREFERRED EMBODIMENTS

The effects of CO$_2$ are illustrated in the following detailed description and in the figures wherein—

FIG. 3 is a current-potential curve on a pressurized full fuel cell showing the effects of CO$_2$ addition to the oxygen electrode.

Figure 1:
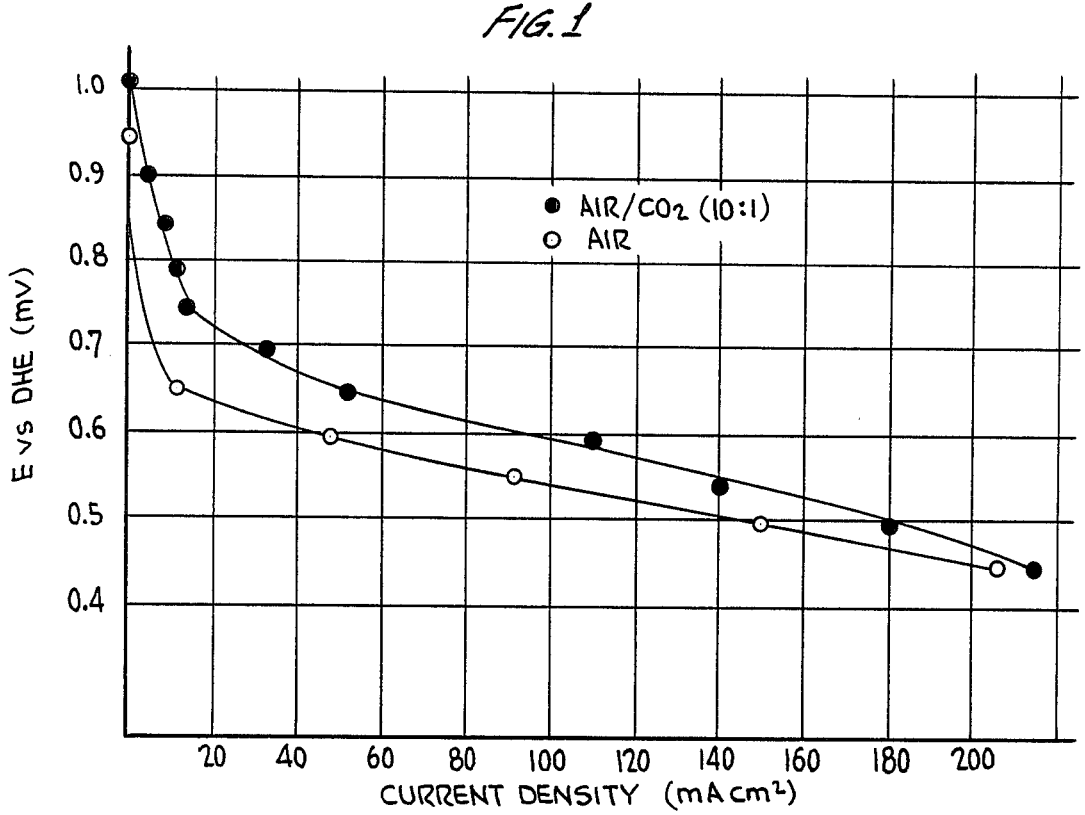
FIG. 1 is a current-potential curve on a half-cell illustrating the effects of CO$_2$ on cell performance.

FIG. 1, illustrates the effects of CO$_2$ in a half-cell. In the half-cell used in the experiments, the current-potential curve of an individual electrode system is measured by clamping a 1 cm$^2$ Teflon-bonded electrode with an inert, electric lead, and "floating" the electrode on the surface of the aqueous carbonate electrolyte in an atmosphere of the reactant gas. The cell is hermetically closed, but for a gas inlet and one-way outlet, so as to allow control of the atmosphere. The electrochemical measuring system is completed by means of an inert platinum sheet counter-electrode and a reference electrode immersed in the electrolyte. The resulting three-electrode system is operated with a potentiostat power supply. Due to the wetting properties of the hydrophobic gas electrode, which can be considered as a combination of two interlocked networks, one being hydrophilic and the other hydrophobic—the position of the electrode with respect to the solution level is not critical, provided the electrode in contact with the electrolyte is not completely submersed.

Referring to FIG. 1, the i(E) curves of experiment 1 were run with CO$_2$-free air, and those of experiment 2 were run with a gas mixture containing 10 parts air and 1 part CO$_2$. In both cases the electrolyte was saturated K$_2$CO$_3$. The electrode in both experiments was a Teflon-bonded XC-72 Vulcan loaded with 0.5 mg/cm$^2$ of Pt, the cell temperature was 117° C., and the saturator temperature 88° C. which corresponds to 487 mm of Hg of water vapor pressure. From FIG. 1 a substantial, positive effect of CO$_2$ addition to the air is established, especially at current densities lower than 150 mA. The effect decreases with increasing current density, probably because of the low CO$_2$ partial pressure used.

To prove that the effect was due to C0$_2$ and not an irreproducible time effect, the potential was maintained constant at 800 mV and the gas composition was changed. Thus, with 1:10 CO$_2$/air gas mixture, the cell provided a current of 24 mA/cm$^2$; after removal of the CO$_2$ supply the current dropped to 4.5 mA/cm$^2$. Subsequent addition of CO$_2$ made the current increase rapidly to 17 mA/cm$^2$. The difference between the initial and the final measurement was attributed to changes in electrode wetting.

Figure 2:
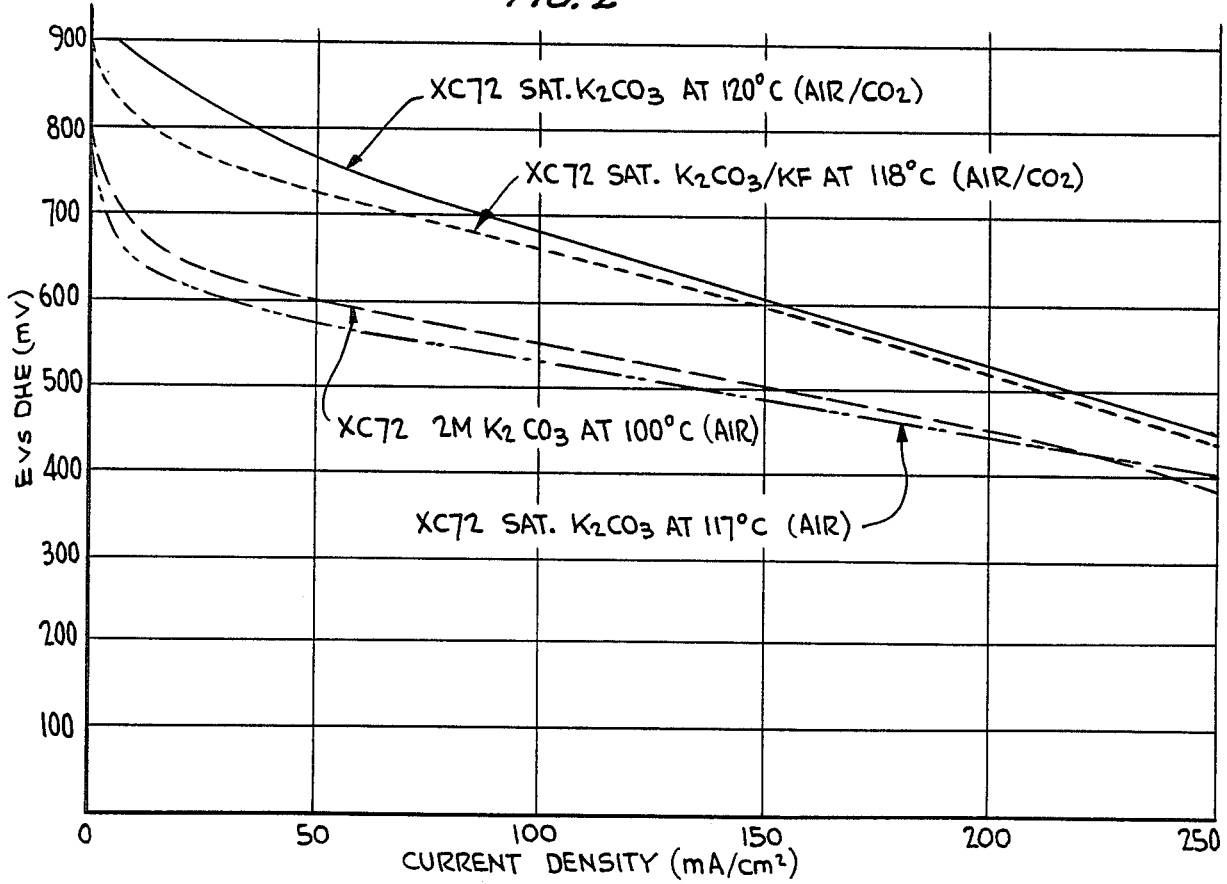
FIG. 2 is a current-potential curve again on a half-cell further showing the effects of CO$_2$ addition to the oxygen electrode.

In a series of air cathode performance measuring experiments in the same half-cell using various temperatures, the measurements with CO$_2$ addition gave considerably better performance as shown by comparing curves A and B and C and D of FIG. 2.

Although the carbon dioxide addition to the air stream has been utilized in molten carbonate electrolyte fuel cell technology, this is required because in the molten carbonate cell, which has a water-free molten carbonate electrolyte, the current flow is via CO$_3$= ions. The reaction at the cathode is —

$$CO_2 + \tfrac{1}{2} O_2 + 2e^- \rightarrow CO_3^= \quad (4)$$

The CO$_3$=ion migrates under the pull of the electric potential to the anode where the reaction is

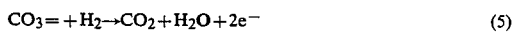

$$CO_3^= + H_2 \rightarrow CO_2 + H_2O + 2e^- \quad (5)$$

However, heretofore, the addition of CO$_2$ to the cathode of an aqueous carbonate fuel cell was not done in that it was believed that in an aqueous electrolyte the OH$^-$ formed at the cathode, according to reaction (2) above, would be neutralized by HCO$_3$ to produce CO$_3$= according to the equation—

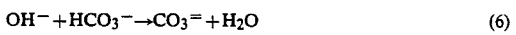

$$OH^- + HCO_3^- \rightarrow CO_3^= + H_2O \quad (6)$$

or the sum of reactions (2) and (6)

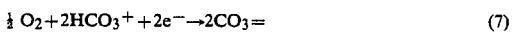

$$\tfrac{1}{2} O_2 + 2HCO_3^+ + 2e^- \rightarrow 2CO_3^= \quad (7)$$

These three reactions are proposed by Cairns and Bartosik as shown in equations (5), (6), and (7) of Ref. 2. It was assumed that the CO$_3$= ion would subsequently migrate to the anode to form HCO$_3^-$ according to reaction (1) and

$$2H^+ + 2CO_3^= = 2HCO_3^- \quad \text{(8) or the sum of both reactions—} H_2 + 2CO_3^= \rightarrow 2HCO_3 \text{(9)}$$

The mechanism involving reactions (6) through (9) can be referred to as the carbonate transport mechanism.

It is now believed that the reaction leading to a high electrode potential as a result of adding CO$_2$ is reaction (2), followed by a CO$_2$ consuming reaction such as—

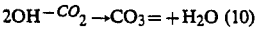

$$2OH^- \xrightarrow{CO_2} CO_3^= + H_2O \quad (10)$$

or

$$2OH^- + 2CO_2 \rightarrow 2HCO_3^- \quad (10')$$

wherein the sum of each of these reactions with reaction (2) gives—$1/2$ O$_2$ + CO$_2$ + 2e$^- \rightarrow$ CO$_3^=$ (11)

or

$$\tfrac{1}{2} O_2 + 2CO_2 + H_2O + 2e^- \rightarrow 2HCO_3^- \quad (11')$$

In a full cell the $CO_3=(HCO_3^-)$ would be transported by diffusion and migration to the anode where the reaction is reaction (1), followed by—

$$2H^+ + CO_3 = \rightarrow CO_2 + H_2O \tag{12}$$

or $$2H^+ + 2HCO_3^- \rightarrow 2CO_2 + 2H_2O \tag{12'}$$

whereby the sum of each of these reactions with reaction (1) gives—

$$H_2 + CO_3 = \rightarrow CO_2 + H_2O + 2e^- \tag{13}$$

or $$H_2 + 2HCO_3^- \rightarrow 2CO_2 + 2H_2O + 2e^- \tag{13'}$$

The mechanism involving reactions (10) through (13') can be referred to as the carbon dioxide transport mechanism. The fact that the electrode performance is higher with $CO_2$ addition to the cathode indicates that this mechanism involving $CO_2$ transport from cathode gas to anode gas advantageously operates in an aqueous carbonate electrolyte fuel cell.

To further establish the effectiveness of the addition of carbon dioxide to the cathode of an aqueous carbonate fuel cell electrode, full cell experiments were carried out. The test fuel cell utilized was constructed as follows: The active component of the full cell is a cathode-electrolyte filled matrix-anode sandwich with a slightly larger than 2"×2" electrode area facing each other with an over-extending asbestos matrix in between. For testing, the sandwich is placed between two flat, rectangular graphite plates (4.5"×5.75"×1.0" thick), each containing a cavity for one of the two reactant gases. These cavities with dimensions of 2"x 2" have been so machined as to leave a number/in² of regularly distributed, unmachined square "pins" (1/16"×1/16") for electrical contact between the fuel cell electrodes and the graphite plates. The two graphite plates, with the machined surfaces facing each other, together with the appropriate Teflon gaskets (for electric insulation as well as for containment of gases and electrolyte) enclose the active fuel cell sandwich, exposing 2"×2" of electrode surface area. The over-extending asbestos matrix is in contact with an electrolyte reservoir in another cavity of one of the plates so as to supply electrolyte by wicking to the active fuel cell area. The two graphite plates are clamped with the appropriate insulating bolts between two steel end plates. Heat is provided to the test cell by two flexible electrical heaters glued one to each steel end plate. (In an actual fuel cell stack, heat is provided by the cell inefficiency.) Paths for gas inlet and outlet to each cavity have also been bored in the plates. These paths are connected to the two gas supply sub-systems with thermostated saturators, flow meters, gauges, and valves so as to regulate the water partial pressure, flow rate, and anode/cathode gas differential pressure. The electric measuring system allows resistance load adjustment and measurement of cell voltage and current.

With the unpressurized cell as above described, experiments were conducted as characterized in Table 1 as follows:

TABLE 1

Electrolyte (initial composition): 5 molar $K_2CO_3$ and 5 molar KF
Anode: Teflon-bonded electrode with platinum catalyst (approximately 15 mg Pt/cm²) on screen
Cathode: Teflon-bonded carbon electrode containing 5 mg carbon (Vulcan XC-72) with 10% Pt (Total Pt: 0.5 mg/cm²) and 40% TFE
Matrix: 5 mil asbestos paper
Anode Gas Composition: $H_2/CO_2$ (80/20 on dry basis)
Anode Gas Utilization: Very low
Cathode Gas Composition: $O_2/CO_2$ (50/50 on dry basis)
Cathode Gas Utilization: Very low
Cell Temperature: 105° C.
Saturator Temperature: 95° C. (corresponding to an equilibrium water vapor pressure of 634 mm of Hg)

The results obtained with the unpressurized full cell did not show the improvement expected based on the half cell results. It is believed that the failure to show the total improvement is a result of the relatively low operating temperature of the cell. Accordingly, to further show the effectiveness of the addition of carbon dioxide to the cathode of an aqueous carbonate electrolyte fuel cell, experiments were conducted on the completed cell described hereinabove under pressure. The pressurizing of the cell was accomplished by placing the cell as above described inside of a heavy wall cylinder container which is hermetically bolted and which is designed to be pressurized with an inert gas such as nitrogen. The cell is brought to pressure by gradually increasing the pressure of the anode gas, the cathode gas, and the pressurized container. This is accomplished by throttling exit valves to the three compartments. The characteristics of the pressurized cells are shown in Tables 2, 3, and 4 as follows:

TABLE 2

Electrolyte (initial composition): 10 molar $K_2CO_3$
Anode: Teflon-bonded electrode containing Pt black (15 mg/cm²) (40% TFE) on Teflonated carbon paper
Cathode: Teflon-bonded electrode containing Pt on carbon catalyst (5 mg carbon, XC-72 Vulcan, with 10% Pt; 40% TFE) on Teflonated carbon paper
Matrix: 5 mil asbestos paper
Anode Gas Composition: $H_2/CO_2$ (80/20 on dry basis)
Anode Gas Utilization: Very low
Cathode Gas Composition: $O_2$ with $CO_2$ (50/50 on dry basis)
Cathode Gas Utilization: Very low
Cell Temperature: 144° C.
Cell Pressure: 90 psig
Saturator Temperature: 160° C.

TABLE 3

Electrolyte (initial composition): 10 molar $K_2CO_3$
Anode: Teflon-bonded electrode containing Pt black (15 mg Pt/cm²) (40% TFE) on Teflonated carbon paper
Cathode: Teflon-bonded electrode containing Pt on carbon catalyst (5 mg carbon, XC-72 Vulcan, with 10% Pt; 40% TFE) on Teflonated carbon paper
Matrix: 5 mil asbestos
Anode Gas Composition: $H_2/CO_2$ (80/20 on dry basis)
Anode Gas Utilization: Very low Cathode Gas Composition: $O_2/CO_2$ (50/50 on dry basis) or pure $O_2$
Cathode Gas Utilization: Very low
Cell Temperature: 140° C.
Cell Pressure: 85 psig
Saturator Temperature: 160° C.

TABLE 4

Electrolyte (initial composition): 10 molar $Cs_2CO_3$
Anode: Teflon-bonded electrode containing Pt on carbon catalyst (5 mg carbon, XC-72 Vulcan, with 10% Pt; 40% TFE) on Teflonated carbon paper
Cathode: Teflon-bonded electrode containing Pt on carbon catalyst (5 mg carbon, XC-72 Vulcan, with 10% Pt; 40% TFE) on Teflonated carbon paper
Matrix: 5 mil asbestos
Anode Gas Composition: $H_2/N_2$ (80/20 on dry basis)
Cathode Gas Composition: $O_2/CO_2$ (50/50 on dry basis)
Cell Temperature: 155° C.
Cell Pressure: 120 psig
Saturator Temperature: 157° C.

The cell of Table 2 under test provided a voltage of mV at 200 mA/cm$^2$. This relatively high performance indicates that the carbon dioxide added to the cathode gas substantially improved the cell performance. The improved performance of Table 2 was confirmed based on the cells characterized in Tables 3 and 4. On direct comparison, the oxygen and carbon dioxide mixture added to the cathode over pure oxygen provided substantially improved performance as illustrated by the curves in FIG. 3. Table 4, in addition, shows the use of low platinum loadings at the anode. The obtained i(E) curve is substantially the same as obtained with high platinum loadings.

The aqueous carbonate electrolyte useful according to this invention can be any of the available carbonates such as cesium carbonate, potassium carbonate, rubidium carbonate, sodium carbonate, and mixtures thereof. Inert salts such as fluorides or even chlorides can be added to the electrolyte, if desired. The concentration of the aqueous carbonate electrolyte preferably is in the range of from about 25 to 95% by weight carbonate depending upon the temperature and pressure of the fuel cell and upon the nature of the particular carbonate or mixture of carbonates utilized. In accordance with the present invention, it is to be understood that the carbonate electrolytes contain the corresponding bicarbonates.

In operation of the cell to obtain the beneficial effects, it has been found that the carbon dioxide can be added to either the fuel stream being fed to the anode or to the oxidant stream being fed to the cathode. In a cell where the anode is fed with a fuel that is a mixture of gases including hydrogen and carbon dioxide, or methanol and/or CO, it has been found that as the cell reaction proceeds the anode stream becomes fuel depleted, effectively building up the amount of carbon dioxide in the vicinity of the anode. When this happens, the $CO_2$ transfer (as $HCO_3-$) effectively would be in the direction of the cathode. At times, depending upon the conditions of operation, it can be desirable and effective to add some of the carbon dioxide at each of the cathode and anode.

It has been found that relatively low levels of carbon dioxide when added to the cell will provide an advantageous result. It has been further found, however, that there is a degree of criticality in order to obtain the most beneficial effect. In theory and according to the "$CO_2$ transport mechanism," the ratio of $CO_2/O_2$ at the cathode should be four at equal $CO_2$ and $O_2$ utilization. However, it is possible that as the $CO_2/H_2$ ratio increases toward the anode outlet, the production of $HCO_3-$ increases due to the difficulty in rejecting $H_2CO_3$ as $CO_2$ at the anode and as a consequence the "carbonate transport mechanism" becomes possible. The carbonate transport mechanism is believed to contribute to the effectiveness of lower levels of the $CO_2$ at the cathode. In general, the total amount of carbon dioxide added to the cell, i.e., at the anode and cathode, should be sufficient so that the concentration of free hydroxyl ions in the immediate vicinity of the cathode is at most mildly alkaline, i.e., a pH of about 7.4 to 9.0; and the concentration of free hydrogen ions in the vicinity of the anode is slightly alkaline or at most slightly acidic, i.e., a pH of about 7.8 to 5.7. Generally the preferred ratio of $CO_2$ added to the cathode is from about one volume of carbon dioxide for each volume of reacted oxygen up to about four volumes of carbon dioxide per volume of oxygen, with the operable ratios being from about 1:5 and 5:1. Generally the preferred ratio of $CO_2$ added to the anode is an amount equivalent to maintain a $CO_2$ to hydrogen ratio of about three volumes of $CO_2$ per volume of hydrogen, with the operable ratio throughout the anode being about 2:3 to 9:1. The hydrogen and the $CO_2$ can be present as free entities, or combined into a fuel such as methanol or carbon monoxide. Although higher ratios can be utilized, the effect is not beneficial. It has been determined that the most beneficial effect for both the carbonate transport and the $CO_2$ transport mechanisms is obtained when thin electrolyte matrices are used. As "thin matrix" is utilized herein, it is a matrix having a thickness of less than 20 mils, and preferably less than about 7 mils.

In a fuel cell utilizing the aqueous carbon electrolyte it is possible to utilize fuel containing relatively significant amounts of carbon monoxide without poisoning. Additionally, the fuel stream can tolerate substantial amounts of carbon dioxide without influencing the invariability of the electrolyte since the carbonate electrolyte is carbon dioxide tolerant. It is possible, therefore, to utilize a reformed stream obtained by the reformation of hydrocarbons such as methane, ethane, naptha and other hydrocarbon mixtures, for example, as well as substantially pure hydrogen streams as the fuel. Additionally, the fuel can effectively be reformed or unreformed methanol.

The electrodes which are conventionally utilized in low and medium temperature cells can be utilized effectively in accordance with the fuel cells of the present invention. Thus, the Teflon-bonded electrodes which are highly satisfactory in the aqueous phosphoric acid electrolyte fuel cells are very suitable for utilization in the present fuel cells. These electrodes can include conductive screens, carbon cloth, or carbon paper as substrate and current carriers in accordance with conventional practice. Moreover, it has been found that the amount of platinum in the electrode when utilized as either the anode or cathode can be reduced substantially from the amount commonly used, i.e., to less than about 1 mg/cm$^2$ of electrode surface, and still obtain useful results. Additionally, other electrodes including the porous structures containing activated carbons and the like can be utilized. Because of the less corrosive environment, base or less noble metals relative to platinum can be utilized as the electrode catalyst in supported or unsupported form. These catalysts include nickel, cobalt, and their oxides, gold, and silver, as well as combinations of such elements exemplified by nickel-cobalt oxides, silver-nickel, and the like at the cathode; and nickel, cobalt, and their combinations at the anode. As supports, carbon and metal oxides can be used.

It is also to be understood that the cells of the present invention, in that the electrolyte is substantially non-corrosive, can use a wide range of materials within the cells not heretofore available for selection. Thus, the cell can be constructed with separators or bipolar plates made of steel or nickel-plated steel, and the like materials. The ability to utilize the more non-noble materials results in cells substantially less expensive in construction.

As a result of the present invention, it has also been possible to operate aqueous carbonate fuel cells at a high pressure with it being found that the performance of the cell is substantially improved. The high operating pressures permit the use of high partial pressures of water and also permit high conversion of carbonate to the bicarbonates at high $CO_2$ partial pressures. Thus, it is possible to operate cells at pressures of at about 1 Atm to 20 Atm while maintaining the cell temperatures at from about 80° C. to 250° C.

The carbon dioxide which is to be added to the fuel cell can be carbon dioxide from any conventional source. However, a preferred source of carbon dioxide for addition to the cathode is obtained by burning the effluent of the anode in air which is then added to the cathode. Carbon dioxide for addition to the anode can be obtainable by recycling the effluent from the anode.

As will be apparent to one skilled in the art, various modifications can be made within the scope of the aforesaid description. Such modifications being within the ability of one skilled in the art form a part of the present invention and are embraced by the appended claims.

It is claimed:

1. The method of operating a fuel cell comprising oxygen and fuel electrodes and an aqueous carbonate electrolyte comprising the step of adding carbon dioxide to at least one of said fuel oxygen electrodes during operation of the cell in an amount sufficient to maintain the concentration of free hydroxyl ions in the immediate vicinity of the oxygen electrode at most mildly alkaline and the concentration of free hydrogen ions in the vicinity of the anode slightly alkaline or at most slightly acidic and so as to provide an improvement in the electrical performance of the cell in comparison to the same cell operated under the same conditions but without the addition of $CO_2$.

2. The method of claim 1 wherein the carbon dioxide is added at the oxygen electrode.

3. The method of claim 1 wherein the carbon dioxide is added at the fuel electrode.

4. The method of claim 1 wherein the carbon dioxide is added at each fuel and oxygen electrodes.

5. The method of claim 1 wherein at least the fuel electrode is a Teflon-bonded, platinum-containing electrode.

6. The method of claim 5 wherein the Teflon-bonded electrode includes less than about 1 $mg/cm^2$ platinum.

7. The method of claim 1 wherein the ratio of carbon dioxide to oxygen supplied to the oxygen electrode is four.

8. The method of claim 1 wherein the ratio of carbon dioxide to oxygen supplied to the oxygen electrode is two.

9. The method of claim 1 wherein the fuel cell is operated at greater than atmospheric pressure.

10. The method of claim 2 wherein the carbon dioxide fed to the oxygen electrode is obtained by burning the effluent from the fuel electrode of the cell in air.

11. The method of claim 3 wherein the carbon dioxide added to the fuel electrode is obtained by recycling the effluent of the fuel electrode.

12. The method of claim 1 wherein the ratio of carbon dioxide to oxygen supplied to the oxygen electrode is one.

13. The method of claim 9 wherein the carbon dioxide is added to the oxygen electrode.

14. The method of claim 13 wherein the ratio of carbon dioxide supplied to the oxygen electrode is from about one volume of carbon dioxide for each volume of reacted oxygen up to about four volumes of carbon dioxide per volume of reacted oxygen.

* * * * *